United States Patent
Brisset et al.

(10) Patent No.: US 10,681,934 B2
(45) Date of Patent: Jun. 16, 2020

(54) PROCESS AND FACILITY FOR PRODUCING A POWDERED POROUS PRODUCT

(71) Applicant: CLEXTRAL, Firminy (FR)

(72) Inventors: Alain Brisset, Unieux (FR); Maxime Collado, Pont-Salomon (FR)

(73) Assignee: CLEXTRAL, Firminy (FR)

( * ) Notice: Subject to any disclaimer, the term of this patent is extended or adjusted under 35 U.S.C. 154(b) by 185 days.

(21) Appl. No.: 15/545,238

(22) PCT Filed: Jan. 20, 2016

(86) PCT No.: PCT/EP2016/051148
§ 371 (c)(1),
(2) Date: Jul. 20, 2017

(87) PCT Pub. No.: WO2016/116513
PCT Pub. Date: Jul. 28, 2016

(65) Prior Publication Data
US 2018/0007950 A1    Jan. 11, 2018

(30) Foreign Application Priority Data

Jan. 21, 2015  (FR) ..................... 15 50481

(51) Int. Cl.
| | | |
|---|---|---|
| A23P 30/40 | (2016.01) | |
| A23C 1/10 | (2006.01) | |
| B01J 2/04 | (2006.01) | |
| B01F 3/04 | (2006.01) | |
| A23C 9/152 | (2006.01) | |
| A23P 10/40 | (2016.01) | |
| A23P 30/20 | (2016.01) | |
| B01F 3/22 | (2006.01) | |
| A23G 3/52 | (2006.01) | |

(52) U.S. Cl.
CPC ............... *A23P 30/40* (2016.08); *A23C 1/10* (2013.01); *A23C 9/1524* (2013.01); *A23P 10/40* (2016.08); *A23P 30/20* (2016.08); *B01F 3/04446* (2013.01); *B01F 3/223* (2013.01); *B01J 2/04* (2013.01); *A23G 3/52* (2013.01); *A23V 2002/00* (2013.01); *A23V 2250/214* (2013.01); *A23V 2250/2108* (2013.01); *A23V 2300/04* (2013.01)

(58) Field of Classification Search
CPC ............ A23P 30/20; A23P 30/40; A23P 10/40

USPC ......................................................... 426/569
See application file for complete search history.

(56) References Cited

U.S. PATENT DOCUMENTS

| | | | |
|---|---|---|---|
| 5,882,717 A | 3/1999 | Panesar et al. | |
| 9,381,473 B2 | 7/2016 | Bonsch et al. | |
| 2003/0008059 A1* | 1/2003 | Macinnes | A23C 1/10 426/590 |
| 2010/0104718 A1* | 4/2010 | Durand | A23L 2/39 426/445 |
| 2010/0215818 A1 | 8/2010 | Kessler et al. | |
| 2014/0197554 A1 | 7/2014 | Bönsch et al. | |
| 2015/0160362 A1 | 6/2015 | Sgarz et al. | |

FOREIGN PATENT DOCUMENTS

| | | | |
|---|---|---|---|
| DE | 10 2011 102 734 A1 | 11/2012 | |
| EP | 1 133 923 A1 | 9/2001 | |
| JP | H10150915 A | 6/1998 | |
| JP | 2003526350 A | 9/2003 | |
| JP | 2010539913 A | 12/2010 | |
| WO | 0167881 A1 | 9/2001 | |
| WO | 2008/046996 A2 | 4/2008 | |
| WO | 2013/185941 A1 | 12/2013 | |
| WO | 2013185947 A1 | 12/2013 | |
| WO | WO-2013185941 A1 * | 12/2013 | C12N 1/04 |

OTHER PUBLICATIONS

International Search Report, dated May 23, 2016, from corresponding PCT application No. PCT/EP2016/051148.
French Search Report, dated Nov. 30, 2015, from corresponding FR application No. FR1550481.

* cited by examiner

*Primary Examiner* — Jyoti Chawla
(74) *Attorney, Agent, or Firm* — Young & Thompson

(57) ABSTRACT

Disclosed is a process in which a viscous initial product having both a temperature of between 5° C. and 70° C. and a viscosity greater than 100 mPa·s is provided, —by way of a pump provided upstream of at least one aerator, the viscous initial product is transferred as it is to the at least one aerator in which the viscous initial product is mixed with a gas, injected into the aerator, so as to obtain a liquid foam continuously exiting the aerator, and—the liquid foam continuously exiting the at least one aerator is continuously pushed into the inlet of a treatment device which continuously divides and then dries this liquid foam so as to obtain a powdered porous product which has a solids content greater than 90%.

10 Claims, 3 Drawing Sheets

PROCESS AND FACILITY FOR PRODUCING A POWDERED POROUS PRODUCT

The present invention relates to a method and to an installation for producing a powdery porous product.

The invention is more specifically interested in the case of the production of powdery porous products from an initial viscous product, the obtained products being typically so called instantaneous powders, which are for example mixed with water or with other liquids for obtaining, by rehydration of the powders, a homogeneous liquid.

EP-A-1 133 923 discloses a method of this type, for which the main steps consists of:
- preparing a concentrated liquor, for which the viscosity is not explicit, but for which the humidity should be low since the dry material concentration of this concentrated liquor should be greater than 50% by weight;
- foaming this concentrated liquor in a foaming apparatus, with very strong proliferation in order to obtain a well ventilated foaming liquor and therefore unstable, while being suitable for collapsing on itself because of its very low specific gravity;
- stabilizing, as soon as its exit from the foaming apparatus, the foaming liquor for obtaining a stabilized foam having an extremely high viscosity, which is greater than $10^5$ Pa·s or even $10^6$ Pa·s and which typically corresponds to that of a sealant for windows, and thereby forming a sufficiently rigid structure, in other words not flowing, in particular non-dispersible, this step for stabilizing the foaming liquor being essential to the production method since it is indispensable for applying the continuation of this method; and
- obtaining a powdery porous product after having first fragmented the stabilized foam and then having dried the fragments resulting from the fragmentation, this drying being limited because the residual humidity of the stabilized foam is a minimum.

WO-A-2008/046996 discloses a method and an installation of this type, wherein the viscous initial product is, before being mixed with gas in an aerator for forming a liquid foam which is then divided and dried for obtaining a powdery porous product, subject to the action of a thermomechanical treatment machine, typically an extrusion machine. In this machine, the viscous initial product is mechanically worked, notably subject to controlled shearing, and/or thermoregulated in order to condition at best with view to its admission in the aerator. WO-A-2008/046996 even proposes the use of a thermomechanical treatment machine for producing a first mixture between the viscous initial product and a gas, in order to initiate porosity in the treated material, the mixture of the latter with gas being intensified in the aerator connected in continuity with the extrusion machine.

On its side, WO-A-2013/185941 is interested in a more specific production of powdery porous products, i.e. those containing probiotics or similar microorganisms. There again, the viscous initial product is, before being sent to an aerator for forming a foam which is then divided and dried for obtaining the powdery porous product, mechanically and/or thermically treated with a thermomechanical treatment machine, such as an extrusion machine or a heat exchanger with a scraped surface. Like in WO-A-2008/046996, gas is mixed to the material produced by the thermomechanical treatment machine, this gas may be directly introduced into this machine and/or into the aerator.

It is understood that WO-A-2008/046996 and WO-A-2013/185941 both teach that a mechanical and/or thermal treatment by an ad hoc thermomechanical treatment machine, notably an extrusion machine, is indispensable for "preparing" the viscous material at its admission into the aerator for forming foam, notably by lowering the viscosity of this material before its admission into the aerator. This is understood from the fact that, by definition, an aerator is a mechanical mixer which is not designed for acting on too strongly viscous materials.

However, the use of thermomechanical treatment machines, notably extrusion machines, induces stresses. Indeed, these thermomechanical treatment machines are mechanically complex pieces of equipment with systems of gears and reducers, sometimes provided with bearings and rotating joints, as well as with screws, scrapers with a rotating axis, these pieces of equipment being generally thermoregulated, at variable speed and sometimes equipped with vacuum application systems. Moreover when one operates with products with very high added value and/or when the intention is to produce from very small amounts, for example with a production throughput of less than 40 kg/h, the aforementioned thermomechanical treatment machines are too bulky and require amounts of several kilograms, for example between 10 and 50 kg, for achieving the manufacturing of porous powder. More globally, it is understood that the application of methods using such thermomechanical treatment machines is costly in raw material and requires place on the ground, personnel for operation and a significant investment in sophisticated apparatuses.

In order to partly circumvent these drawbacks, WO-A-2013/185941 contemplates an alternative to the continuous production of powdery porous products, by resorting to a discontinuous method: for this, the viscous initial product is placed in a hermetic enclosure which is stirred, from the pressure inside the enclosure being generated by injection of a gas. Thus, the gas, which is discontinuously injected into the enclosure, pressurizes the latter and is partly dissolved in the viscous product. This enclosure is then mechanically stirred, either manually or by means of an ad hoc mechanical system. In practice, the efficiency of the mixing is not rarely controlled, the latter being subsequently taken out of the enclosure so as to be directly divided and dried. It is understood that this discontinuous alternative, proposed in WO-A-2013/185941 is suitable for producing very small amounts of powdery porous products, but it remains tedious to apply and may be controllable.

The object of the present invention is to improve the methods and installations for continuous production of powdery porous products, by simplifying them, notably in the case when the amount of raw material is small.

For this purpose, the object of the invention is a method for producing a powdery porous product, wherein:
- a viscous initial product having both a temperature comprised between 5° C. and 70° C. and a viscosity greater than 100 mPa·s is provided,
- by means of a pump provided upstream from at least one aerator, the viscous initial product is transferred as such as far as said at least one aerator in which the viscous initial product is mixed with a gas, injected into the aerator, for obtaining a liquid foam continuously leaving the aerator, and
- the liquid foam continuously leaving said at least one aerator is continuously pushed into an inlet of a treatment device which, continuously divides and then dries this liquid foam in order to obtain a powdery porous product which has a dry material level greater than 90%.

The object of the invention is also an installation for producing a powdery porous product, notably allowing the application of the method defined above, this installation comprising:
- a pump for transferring a viscous initial product having both a temperature comprised between 5° C. and 70° C. and a viscosity greater than 100 mPa·s,
- at least one aerator, to which are admitted the viscous initial product, discharged as such by the pump, and a gas, and which mixes the viscous initial product and the gas for obtaining a liquid foam continuously leaving said at least one aerator, and
- a continuous treatment device of the liquid foam, this treatment device being downstream from the aerator and being provided for, continuously, dividing and then drying the liquid foam which continuously leaves said at least one aerator and is pushed into an inlet of this treatment device, until a powdery porous product having a dry material level greater than 90% is obtained.

The inventors have established that, surprisingly, resorting to a thermomechanical treatment machine, such as an extrusion machine, is not indispensable for making the viscous initial product capable of being admitted into an aerator. Thus, according to an approach opposite to the teachings of WO-A-2008/046996 and WO-A-2013/185941, the inventors have established that the use of a conventional pump is possible for transferring as far as the aerator the viscous initial product as such, i.e. notably without any substantial heat treatment and without any significant mechanical treatment, i.e. without any heat treatment and without any mechanical treatment other than those exclusively resulting from the pumping with the pump, in other words from the suction, from the pressurization and from the discharge through this pump. In practice, the embodiment of this pump is not limiting of the invention. At the aerator, the viscous initial product, pressurized by the pump, is admitted by the discharge of the pump while gas is injected: under the effect of the discharge pressure of the pump and of the injection pressure of the gas, the viscous initial product is, in spite of its strong viscosity, mixed with the gas by the aerator, so as to form a liquid foam. At the outlet of the aerator, the liquid foam is, under the effect of the pressure prevailing in the aerator, continuously pushed towards a continuous treatment device, placed downstream, which divides this liquid foam into particles and which dries these particles, this device for example being an atomization tower optionally followed by a fluidized bed.

It is understood that the aforementioned pump has the exclusive function of transferring the viscous initial product towards the aerator, with pressurization compatible with this transfer and with the division followed by drying, at the outlet of the aerator, of the liquid foam formed by this aerator. The pump efficiently replaces a more complex mechanical system and simplifies the production method, in this sense that a single gas injection is only used, i.e. that in the aerator, one operates with small amounts of raw material, for example between 1 and 20 kg/h, the initial investment is reduced, the operating and maintenance costs are reduced, and a more compact production installation is proposed than with an extrusion machine or another similar machine for thermomechanical treatment.

According to advantageous additional features of the method and/or of the installation according to the invention:
The specific gravity of the liquid foam leaving said at least one aerator is comprised between 25 and 80% of the specific gravity of the viscous initial liquid.

The liquid foam is continuously pushed from the outlet of said at least one aerator to the inlet of the treatment device either exclusively under the effect of the pressure prevailing in said at least one aerator, or under the combined effect of the pressure prevailing in said at least one aerator and of a transfer by an additional pump provided downstream from said at least one aerator.

The pump discharges the viscous initial product at a pressure comprised between 3 and 20 bars.

The pump discharges the viscous initial product at a pressure comprised between 5 and 10 bars.

The viscous initial product is prepared by mixing and/or by concentrating, notably by evaporation, and/or by heating/cooling, notably for maintaining temperature, one or several ingredients.

The viscous initial product is prepared and sucked up by the pump in a continuous way.

The viscous initial product is provided as a storage which is discontinuously used for supplying a suction of the pump.

The treatment device includes an atomization tower in which the liquid foam leaving continuously said at least one aerator is continuously divided by spraying into liquid foam particles and a first drying is applied to the liquid foam particles.

The treatment device further includes a fluidized bed, to which are sent the liquid foam particles leaving the atomization tower, and wherein a second drying is applied to said particles until said particles have a dry material level greater than 90% and thereby form the powdery porous product.

The viscous initial product is obtained from a solution, suspension or emulsion in a solvent, notably an aqueous medium, containing:
milk, and/or
eggs, and/or
fruits, and/or
vegetables, and/or
algae, and/or
at least one co-product of fractionation of milk, eggs, fruits, vegetables and/or algae, and/or
at least one aromatic ingredient such as coffee, tea and aromatic extracts, and/or
at least one amylaceous ingredient based on cereals or tubers, and/or
at least one ingredient containing entire micro-organisms, and/or
at least one ingredient containing fractions of microorganisms, and/or
at least one protein ingredient selected from among milk proteins, cereal proteins, protein crop proteins, legumes proteins, ovo-proteins and proteins stemming from micro-organisms, and/or
at least one carbohydrate of low molecular weight, and/or
at least one complex carbohydrate, and/or
at least one sweetener, either natural or synthetic, and/or
at least one lipid of animal or vegetable origin, and/or
at least one ingredient containing amphiphilic molecules.

The pump is selected from among a single-screw pump, a pump with gradual cavity, a pump with lobes, and a pump with twin screws.

The treatment device comprises, or even consists in an atomization tower which divides the liquid foam by spraying.

The invention will be better understood upon reading the description which follows, only given as an example and made with reference to the drawings wherein.

Figure 1:
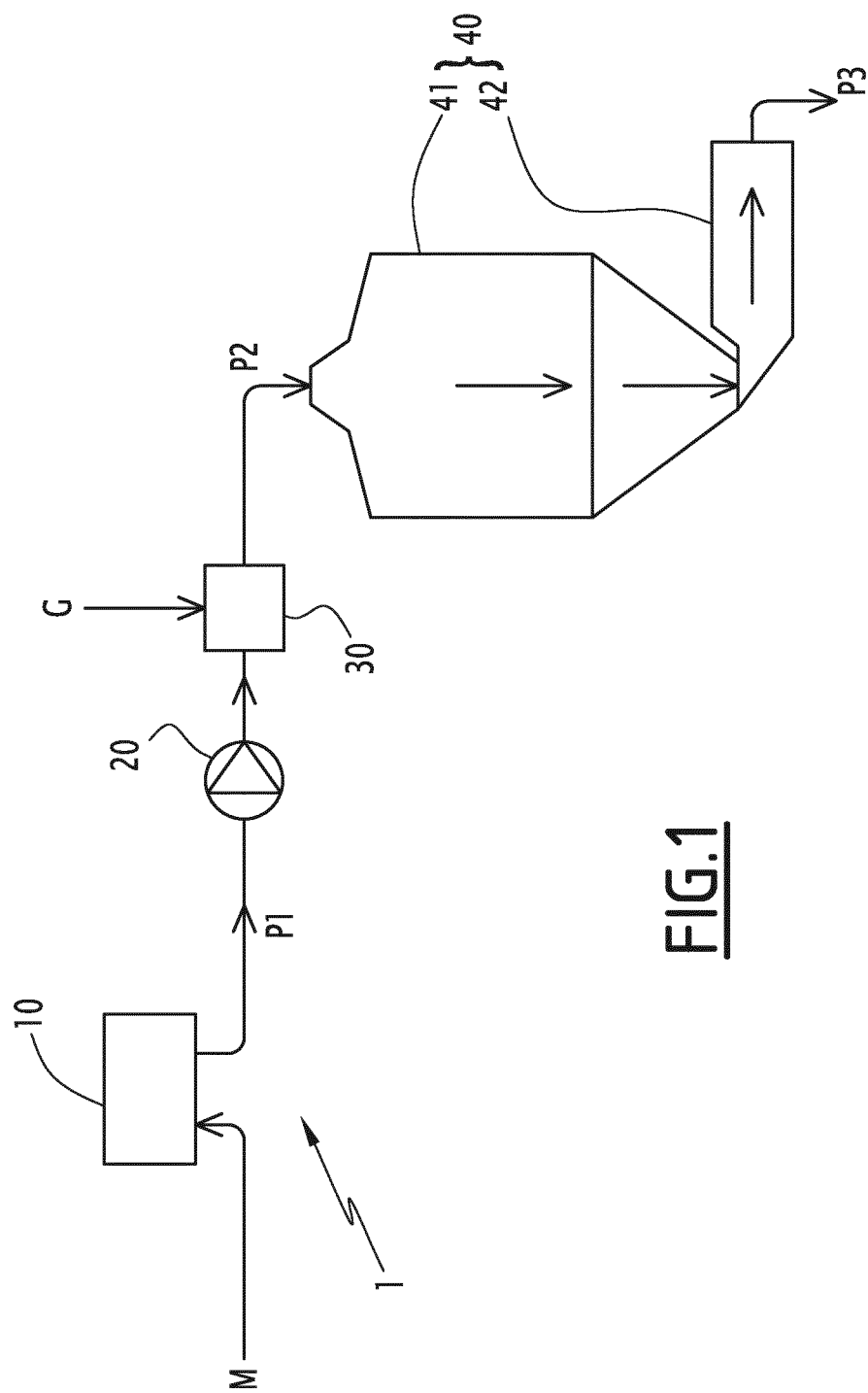
FIG. 1 is a schematic view of an installation according to the invention.

In FIG. 1, is illustrated an installation 1 for producing a powdery porous product P3. The installation 1 is able to apply the production method illustrated in FIG. 2.

The installation 1 comprises a preparation device 10 which, during a corresponding preparation step 110, prepares a viscous initial product P1 from a raw material M.

As preferential examples, the raw material M is the viscous initial product, is obtained from a solution, suspension or emulsion in a solvent, notably an aqueous medium, containing:

milk, or
eggs, or
fruits, or
vegetables, or
algae, or
at least one co-product of fractionation of the milk, of the eggs, of the fruits, of the vegetables and/or of the algae, or
at least one aromatic ingredient such as coffee, tea and aromatic extracts, or
at least one amylaceous ingredient based on cereals or tubers, or
at least one ingredient containing entire micro-organisms, or
at least one ingredient containing fractions of micro-organisms, or
at least one protein ingredient selected from among milk proteins, cereal proteins, protein crop proteins, legumes proteins, ovo-proteins and proteins stemming from micro-organisms, or
at least one carbohydrate of low molecular weight, or
at least one complex carbohydrate, or
at least one sweetener, either natural or a synthetic, or
at least one lipid of animal or vegetable origin, or
at least one ingredient containing amphiphilic molecules; or
a mixture of at least two elements listed above.

The preparation device 10 is designed for, during the preparation step 110, obtaining from the raw material M, the viscous initial product P1 so that the latter has, at the outlet of the preparation device, a temperature comprised between 5° C. and 70° C., as well as a viscosity, at the temperature for making available the viscous initial product P1 at the outlet of the preparation device 10, greater than 100 mPa·s, or even 200 mPa·s, or even 500 mPa·s. It will be noted that usually "mPa" corresponds to "milli-Pascal", i.e. $10^{-3}$ Pa. In other words, at the end of the preparation step 110, the viscous initial product P1, prepared from the raw material M, is at its temperature of availability at the outlet of the preparation device 10, highly viscous.

In practice, the preparation device 10 falls under a technology known per se, notably selected according to the raw material M. As an example, the preparation device 10, which operates in free air or optionally in vacuo, comprises a system for metering a liquid and/or a solid, and/or a mixing system and/or a concentration system, notably by evaporation, and/or a separation system, notably by centrifugation or by a selective membrane, and/or a homogeneization system, and/or a colloidal milling system, and/or a heating/cooling system notably for maintaining temperature, for example by means of pieces of equipment with a jacket or thermoregulated pieces of equipment. Thus, during the preparation step 110, the ingredient(s) of the raw material M is(are) mixed and/or concentrated, notably by evaporation, and/or heated/cooled, notably maintained at a temperature.

In every case, the preparation device 10 advantageously gives the possibility of making available the viscous initial product P1 in a continuous way, in order that this viscous initial product P1 is treated by the remainder of the installation 1 with view to continuously producing the powdery porous product P3.

The installation 1 further comprises a pump 20 which, during a transfer step by pumping 120, transfers the viscous initial product P1, leaving the preparation device 10, as far as an aerator 30, described in more detail subsequently. The suction of the pump 20 is therefore connected to the outlet of the preparation device 10, while the discharge of the pump 20 is connected to the inlet of the aerator 30.

In practice, the pump 20 falls under a technology known per se, capable of transferring as such the viscous initial product P1 from the outlet of the preparation device 10 to the inlet of the aerator 30, in other words of transferring, from the preparation device 10 to the aerator 30, the viscous initial product P1 as available at the outlet of the preparation device 10, without modifying its composition and its density, as well as without modifying substantially its viscosity and therefore the thermomechanical characteristics influencing this viscosity. Of course, notably according to the technology of the pump 20 used, a marginal variation in the viscosity of the initial product P1 may occur between the suction and the discharge of the pump 20, because of the pressurization of the product P1 and, optionally, because of a very slight heating of the product P1, but, overall, in tiny proportions, typically less than 2%.

As non-limiting examples, the pump 20 is a single screw pump, a pump with gradual cavity, a lobe pump, a pump with two screws, etc.

In every case, it is understood that the pump 20 has the exclusive function of transferring the viscous initial product P1 from the preparation device 10 to the aerator 30, by pressurizing the product P1. Advantageously, the pump 20 thereby develops a discharge pressure comprised between 3 and 20 bars, preferably between 5 and 10 bars, at the relevant temperature and viscosity for the viscous initial product P1 transferred, the latter being typically made available at the outlet of the device 10 substantially at atmospheric pressure.

During a step for mixing with gas 130, the aerator 30 mixes the viscous initial product P1, discharged by the pump 20, with a gas G, injected into the aerator 30, in order to obtain a liquid foam P2.

The aerator 30 by itself falls under a technology known per se: this aerator 30 is a mechanical stirrer which stirs, intensely agitates the material which is admitted therein. Within the installation 1 and according to the method of FIG. 2, the mechanical action of the aerator 30 is applied while the gas G is injected into the inside of the aerator in order to induce the porosification of the viscous initial product P1. Surprisingly, while the high viscosity of the product P1 would dissuade from introducing this product as such in a mechanical system such as the aerator 30, the inventors have established that, under the cumulated effect of the discharge pressure of the pump 20 and of the injection pressure of the gas G, the aerator 30 is able to initiate and efficiently conduct the porosification of the viscous initial product P1, until the liquid foam P2 is obtained. It is understood that, inside the aerator 30, the porosification of the material is gradual from the inlet as far as the outlet of the aerator 30, the liquid foam P2 continuously leaving the aerator, under the effect of the pressure prevailing in this aerator.

The liquid foam P2 being intended to be, at the outlet of the aerator 30, divided into particles having a non-negligible liquid phase as explained subsequently, the variation of density between the viscous initial product P1 and the liquid foam P2 formed at the outlet of the aerator is advantageously under control. According to a preferential embodiment, the specific gravity of the liquid foam P2 leaving the aerator 30 is thus comprised between 25 and 80% of the specific gravity of the viscous initial liquid P1.

In practice, the aerator 30 is a static or dynamic aeration apparatus. In the case of a static aeration apparatus, the aerator 30 is for example a mixer with fixed helicoidal parts. In the case of a dynamic aeration apparatus, the aerator 30 for example consists of an apparatus provided with stirring blades or pins mounted on a rotating shaft in a stator, comprising an enclosure generally provided with parts attached on the internal wall of this enclosure and promoting the mixing.

The gas G, injected into the aerator 30, is preferably carbon dioxide. This being as non-limiting alternatives, the gas G may also be air, steam, nitrogen or one of its oxides.

The installation 1 also comprises a continuous treatment device 40 for liquid foam P2 which, during corresponding division 141 and drying 142 steps, treats the foam P2 so as to divide it and to dry it in order to obtain the powdery porous product P3 having a dry material level greater than 90%.

The continuous treatment device 40 falls, as such, under a technology known per se. As a non-limiting example, this device includes, in series an atomization tower 41 with hot air, typically between 100 and 250° C., and a fluidized bed 42: the liquid foam P2, admitted at the inlet of the atomization tower 41 is divided therein by spraying, the particles of the thereby divided foam being then dried in a hot air stream during their passing into a drying enclosure being part of the atomization tower. This drying is, if need be, completed in the fluidized bed 42. As an alternative not shown, the fluidized bed 42 is absent, the division 141 and drying 142 steps then being exclusively ensured by the atomization tower 41. Of course, other pieces of equipment than the atomization tower 41 and/or the fluidized bed 42 may be contemplated for ensuring, during the division 141 and drying 142 steps, the treatment of the liquid foam P2 in order to obtain the powdery porous product P3. Thus, as an alternative, the atomization tower with hot air 41 may be replaced with a cold atomization system, including an enclosure, into which is pushed the liquid foam P2, receives a cold gas with controlled humidity, this cold gas may be cold air, typically between 10° C. and 60° C., or an expansed gas applying a negative temperature. Details and alternatives of the application of these division 141 and drying 142 steps are moreover provided in WO-A-2008/046996, as well as in WO-A-2013/185941, to which the reader may refer to if necessary.

In every case, it is understood that under the effect of the pressure prevailing in the aerator 30 and resulting from the accumulation of the discharge pressure of the pump 20 and of the injection pressure of the gas G, the liquid foam P2 is, at the outlet of the aerator 30, continuously pushed into the inlet of the continuous treatment device 40, and then, at the device 40, is partly or even totally divided into particles, typically by spraying at the inlet of this device 40. A portion of the gas G, injected into the aerator 30, advantageously escapes from the liquid foam P2 during its division, by causing the honeycomb characteristic structure of the grains of the final product P3, notably because of a pressure difference between the outlet of the aerator 30 and the inlet of the device 40, the latter being typically at atmospheric pressure. At the same time, the remainder of the gas G, which has dissolved into the liquid phase of particles of liquid foam, tends to evaporate during the drying, by generating pores in the constitutive material of the grains of the final product P3.

Figure 2:
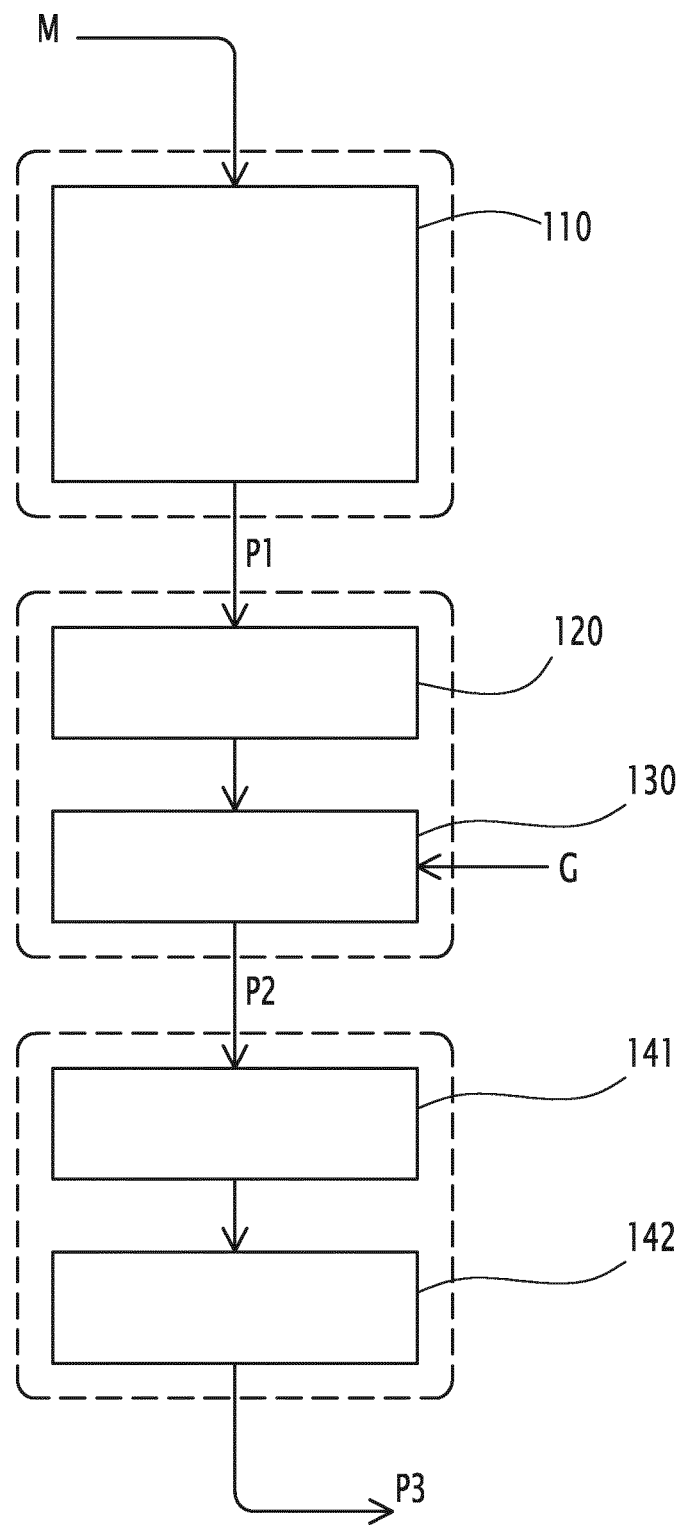
FIG. 2 is a flow chart of a method according to the invention.
Figure 3:
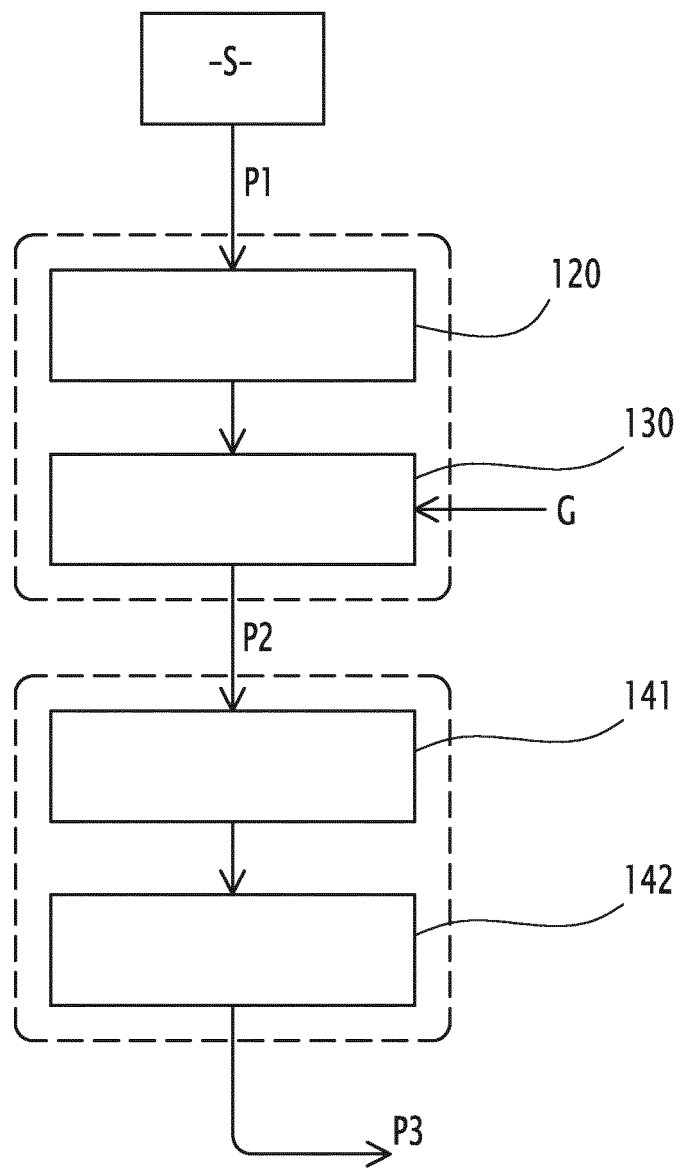
FIG. 3 is a flow chart of an alternative of the method, according to the invention.

As an alternative of the continuous production method of the powdery porous product P3, described up till now with reference to the FIGS. 1 and 2, the method of FIG. 3 gives the possibility of operating partly in a discontinuous way. To do this, the viscous initial product P1 is made available as a storage S, for which the contents are resumed, discontinuously, by the pump 20, the corresponding step for transfer by pumping 120 and the subsequent steps 130, 141 and 142 with view to continuously producing the powdery porous product P3 being identical with those described facing FIG. 2 and therefore bearing the same numerical references in FIG. 3. In practice, the storage S is, prior to the application of this alternative of the production method, supplied with the viscous initial product P1, the latter being for example prepared by the preparation device 10 or a similar device, if necessary offset relatively to the pump 20, to the aerator 30 and to the treatment device 40.

In practice, the storage S is applied by means for example of a storage pan of the viscous initial product P1, so as to maintain the latter under satisfactory conditions, notably temperature conditions, for making available the viscous initial product P1 for the purposes of production of the powdery porous product P3. In every case, during the application of the method of FIG. 3, the suction of the pump 20 is supplied by the storage S, the continuation of the method being identical with the one described earlier in connection with FIG. 2.

Moreover, diverse arrangements and alternatives to the installation 1 and to the production method of the powdery porous product P3, described up till now, may be contemplated. As examples:

in addition to the pump 20 provided upstream from the aerator 30, a pump may be provided downstream from the aerator 30, so as to improve the transfer of the liquid foam towards the device 40, notably by maintaining or increasing the pressure of the liquid foam; in other words, the liquid foam P2 leaving the aerator 30 is then continuously pushed from the outlet of the aerator to the inlet of the treatment device 40 under the combined effect of the pressure prevailing in the aerator and of the transfer by this additional pump; and/or one or several additional aerators, either static and/or dynamic, may be installed downstream from the aerator 30, so as to inject more gas into the liquid foam and/or modify its viscosity; the gas(es) injected into these additional aerator(s) may be of the same nature as the gas injected into the aerator 30 or be different gas(es); if necessary, an additional transfer pump may be added, either between two successive aerators, or downstream from the downstream aerator.

Example: Production of a Coffee Bleach

Ingredients of the raw material (dry):
palm oil 33%, maltodextrin 61%, and food additives 6%.

Preparation step 110: mixing of the ingredients in an aqueous phase, homogeneization, heating of the product followed by evaporation-concentration.

Viscous initial product P1, stemming from the preparation step 110:

availability temperature: 65° C.

viscosity at the availability temperature: 240 mPa·s, dry material level at the availability temperature: 70%, and specific gravity: 1.08 kg/L.

Transfer step by pumping 120:

suction: 62 kg/h, and discharge pressure: 5 bars.

Mixing step with gas 130:

gas G: carbon dioxide, and specific gravity: 0.73 kg/L.

Division 141 and drying 142 steps: application by the succession of a hot air atomization tower and of a vibrating fluidized bed.

Powdery porous product P3 produced:

production throughput: 47 kg/h, and dry material level: 95%.

The invention claimed is:

1. A method for producing a powdery porous product, wherein:
    a viscous initial product having both a temperature comprised between 5° C. and 70° C. and a viscosity greater than 100 mPa·s is provided,
    by means of a pump which is provided upstream from at least one aerator and which discharges the viscous initial product at a pressure comprised between 3 and 20 bars, the viscous initial product is transferred as such as far as said at least one aerator in which the viscous initial product discharged by the pump is mixed by said at least one aerator with a gas, injected into said at least one aerator, for obtaining a liquid foam continuously leaving said at least one aerator, and
    the liquid foam continuously leaving said at least one aerator is continuously pushed into an inlet of a treatment device which, continuously divides by spraying and then dries this liquid foam in order to obtain a powdery porous product which has a dry material level greater than 90%.

2. The method according to claim 1, wherein the specific gravity of the liquid foam leaving said at least one aerator is comprised between 25 and 80% of the specific gravity of the viscous initial liquid.

3. The method according to claim 1, wherein the liquid foam is continuously pushed from the outlet of said at least one aerator to the inlet of the treatment device either exclusively under the effect of the pressure prevailing in said at least one aerator, or under the combined effect of the pressure prevailing in said at least one aerator and of a transfer by an additional pump provided downstream from said at least one aerator.

4. The method according to claim 1, wherein the pump discharges the viscous initial product at a pressure comprised between 5 and 10 bars.

5. The method according to claim 1, wherein the viscous initial product is prepared by mixing and/or by concentrating and/or by heating/cooling one or several ingredients.

6. The method according to claim 1, wherein the viscous initial product is prepared and sucked up by the pump in a continuous way.

7. The method according to claim 1, wherein the viscous initial product is provided as a storage which is discontinuously used for supplying a suction of the pump.

8. The method according to claim 1, wherein the treatment device includes an atomization tower in which the liquid foam leaving continuously said at least one aerator is continuously divided by spraying into liquid foam particles and a first drying is applied to the liquid foam particles.

9. The method according to claim 8, wherein the treatment device further includes a fluidized bed, to which are sent the liquid foam particles leaving the atomization tower, and wherein a second drying is applied to said particles until said particles have a dry material level greater than 90% and thereby form the powdery porous product.

10. The method according to claim 1, wherein the viscous initial product is obtained from a solution, suspension or emulsion in a solvent, containing:
    milk, and/or
    eggs, and/or
    fruits, and/or
    vegetables, and/or
    algae, and/or
    at least one co-product of fractionation of milk, eggs, fruits, vegetables and/or algae, and/or
    at least one aromatic ingredient, and/or
    at least one amylaceous ingredient based on cereals or tubers, and/or
    at least one ingredient containing entire micro-organisms, and/or
    at least one ingredient containing fractions of micro-organisms, and/or
    at least one protein ingredient selected from among milk proteins, cereal proteins, protein crop proteins, legumes proteins, ovo-proteins and proteins stemming from micro-organisms, and/or
    at least one carbohydrate of low molecular weight, and/or
    at least one complex carbohydrate, and/or
    at least one sweetener, either natural or synthetic, and/or
    at least one lipid of animal or vegetable origin, and/or
    at least one ingredient containing amphiphilic molecules.

* * * * *